INVENTOR.
LESLIE M. ROUSH
BY Darby & Darby
ATTORNEYS

INVENTOR.
LESLIE M. ROUSH
BY Darby & Darby
ATTORNEYS

INVENTOR.
LESLIE M. ROUSH
BY Darby & Darby
ATTORNEYS

United States Patent Office 3,433,565

Patented Mar. 18, 1969

3,433,565

MICRO-FILMING PROCESS

Leslie M. Roush, Westbury, N.Y., assignor, by mesne assignments, to Microform Data Systems, Inc., a corporation of Delaware Filed Jan. 10, 1966, Ser. No. 519,553
U.S. Cl. 355—77 2 Claims
Int. Cl. G03b *21/64, 27/32*

ABSTRACT OF THE DISCLOSURE

A method for producing a matrix of microimages comprises the steps of preparing a serial record of the images preferably on thirty-five mm. film, thereafter incrementally stepping the film while continually moving a flat sheet of photosensitive material in a first direction, and energizing a lamp to expose successive portions of the photosensitive material in a first row in order to reproduce consecutively the serially recorded images on the thirty-five mm. film. At the end of a row the sheet is stepped in a direction transverse to the first direction and the process repeated to provide successive rows.

This invention relates to a process for preparing microfilm records, i.e. records wherein data is stored as a plurality of microimages.

It is presently contemplated that entire libraries of information will be stored as microimages, and for obvious reasons it is desirable to reduce such records to a form in which they may be utilized with maximum efficiency. Presently, microimages are normally stored in continuous rolls containing consecutive frames and requiring a prolonged searching period prior to locating a desired record. In those cases where microimages are stored in a matrix form, the overall size of the matrix (hereinafter referred to as a chip) is inconveniently large if the chip is to contain a useful number of individual records.

The present invention is specifically designed to produce a matrix of microimages which may be viewed by the apparatus disclosed in U.S. patent application No. 472,498, filed on July 16, 1965 now U.S. Patent No. 3,361,031, issued Jan. 2, 1968. In that patent the microimages are stored in a flat matrix and automatically positioned with respect to the two matrix axes so that any desired location may be immediately read-out. Each of the images may be .026 inch per side whereby an overall film chip having dimensions of less than three inches per side is capable of storing almost 10,000 separate records.

It is obviously desirable to be able to read-out a selected record without having to manually search for the record and then adjust the focus when it is finally located. Therefore, it is necessary that the images be placed on the chip with extreme accuracy so that when the chip has been located in an identifiable position with respect to the optical read-out, the desired record will be fully and clearly reproduced. Accordingly the main object of the present invention is to provide a process for manufacturing microimages of the type described, wherein the individual images may be reduced by an unusually large factor and placed in position with extreme accuracy.

Another object to the invention is to provide a process for the manufacture of film chips containing a large plurality of microimages wherein the time required for manufacture is substantially less than that possible with state of the art techniques in view of the great reduction and precision of image placement required.

Briefly, in accordance with the invention, the records are first reduced onto a continuous transparency on which they are serially stored. This transparency is then arranged for movement across a photosensitive film from which the negative of the overall film chip is to be produced. The photosensitive material is arranged for continuous movement in a direction transverse to the direction of movement of the transparency and when each frame is suitably positioned, a flash lamp is energized to expose that frame onto the photosensitive material through a reducing lens. The movement of the transparency and photosensitive material, and the operation of the flash lamp are suitably synchronized so that the images are automatically placed on the photosensitive material in consecutive locations until a complete matrix of reduced records has been exposed.

The manner in which the above and other objects of invention are accomplished is more fully described below with reference to the attached drawings wherein.

Figure 1:
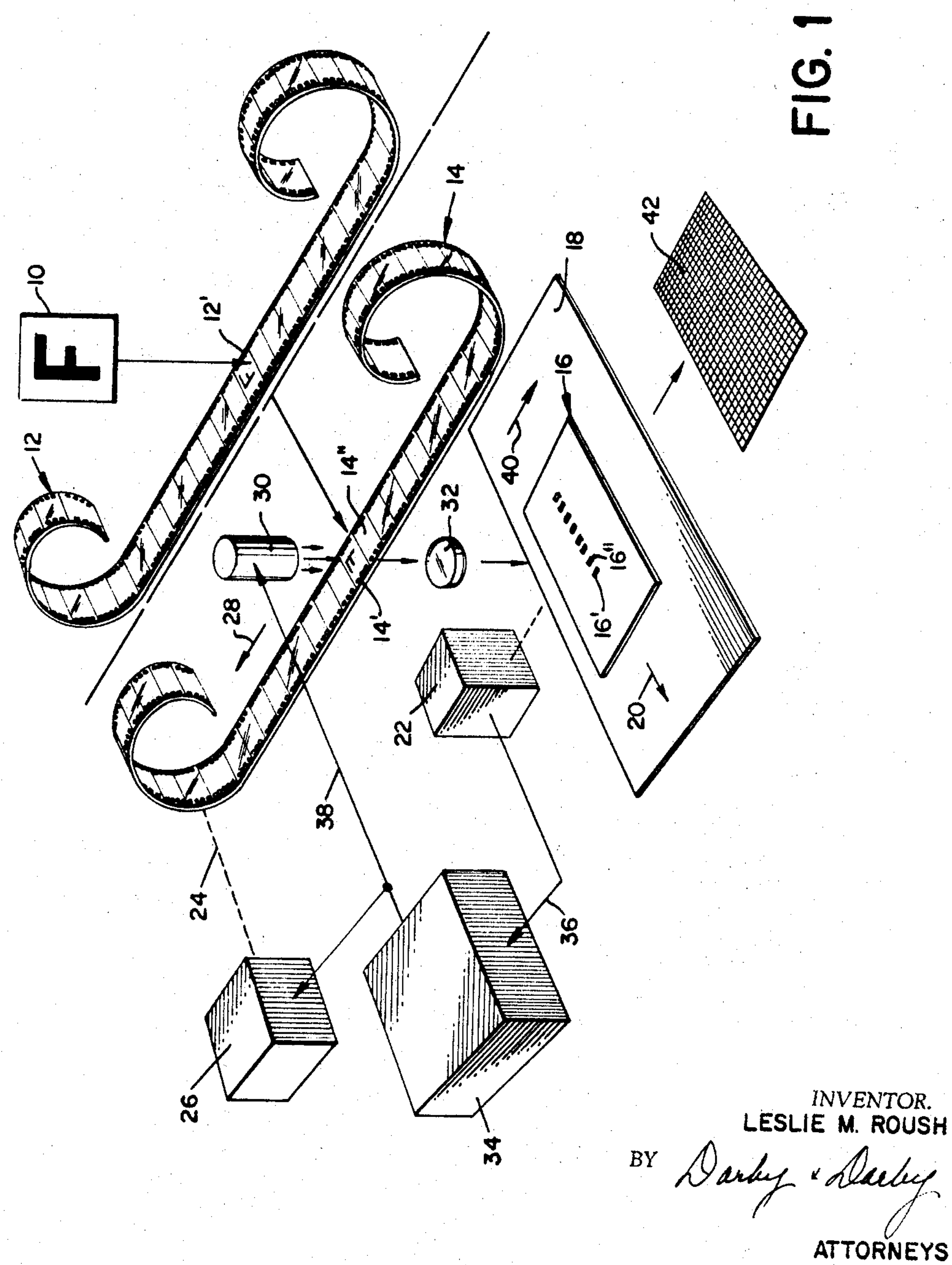
FIG. 1 is a flow-type block diagram illustrating in schematic form the operation of the process and apparatus of the invention.
Figure 2:
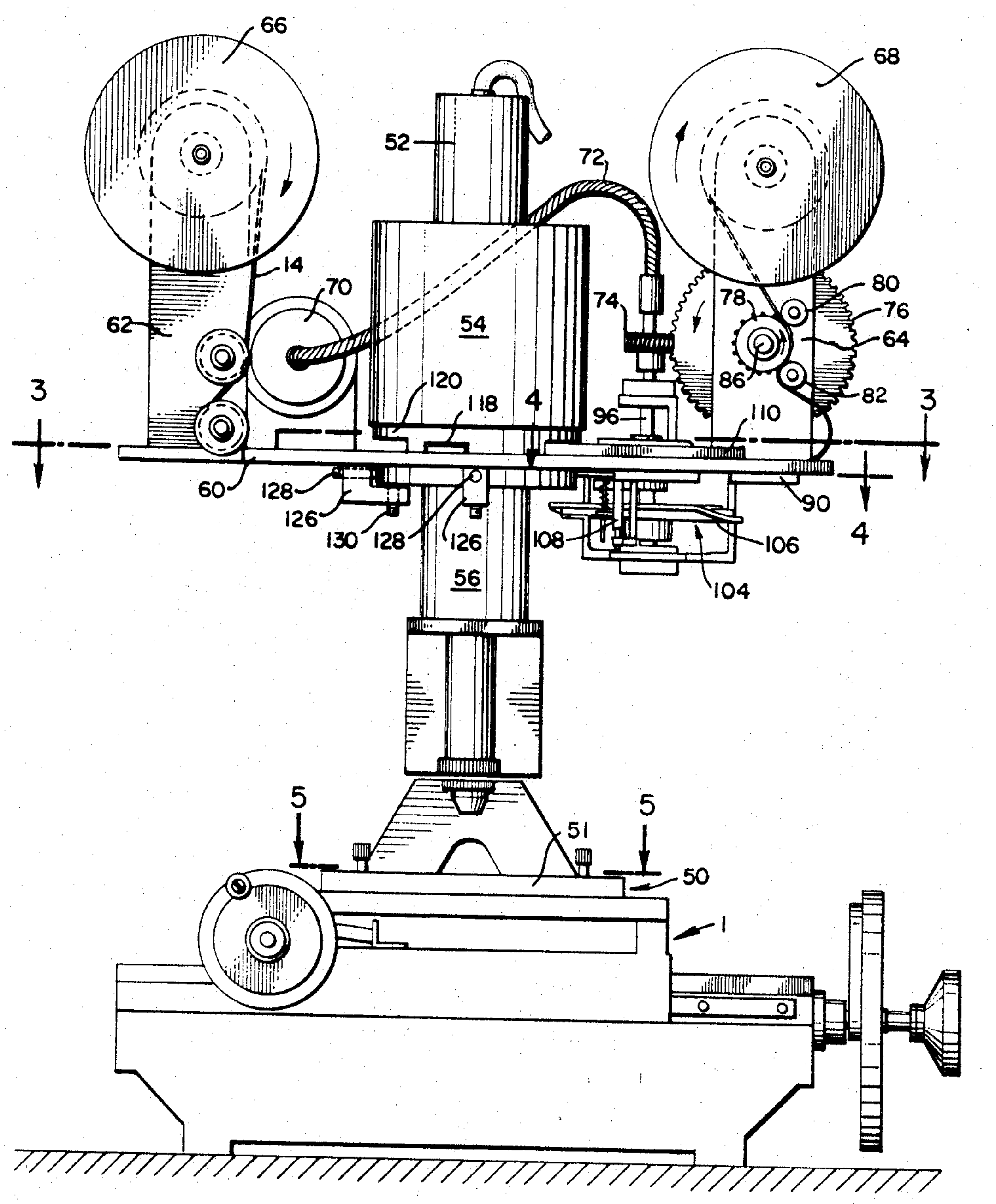
FIG. 2 is a side view partially in section illustrating the apparatus used to strip the continuous film.
Figures 3, 4:
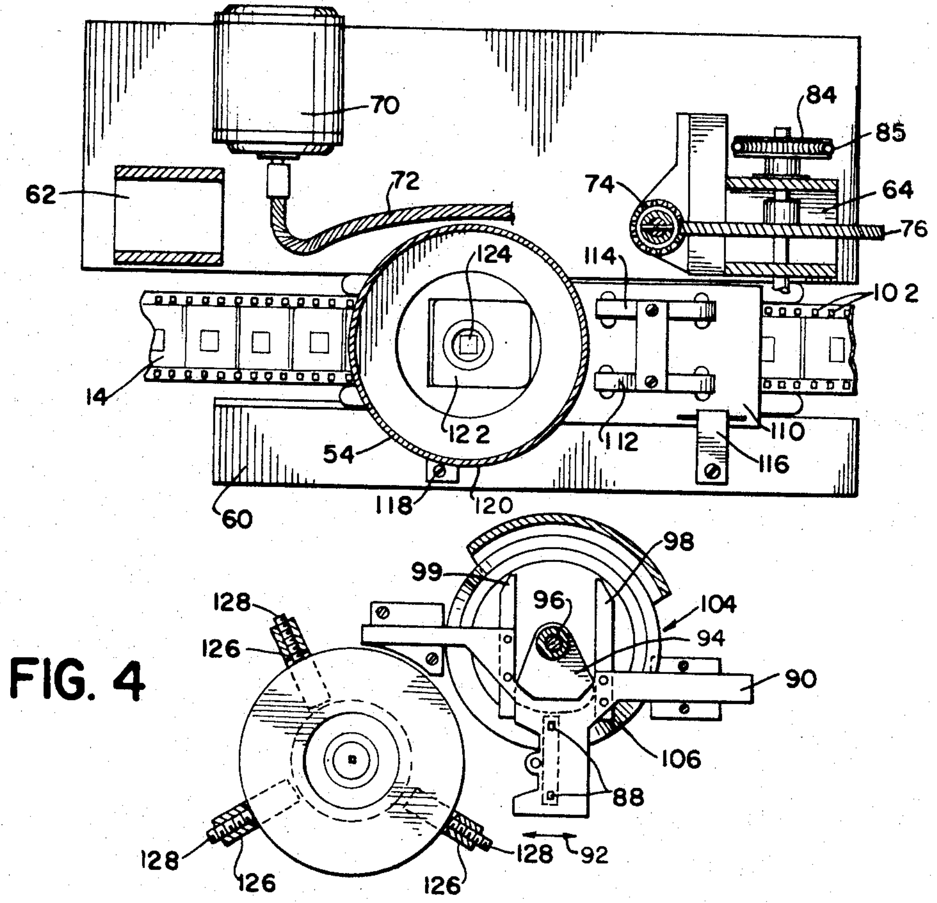
FIG. 3 is a partial cross-sectional top view along line 3—3 of FIG. 2.
FIG. 4 is a partial cross-sectional top view along line 4—4 of FIG. 2.
Figure 5:
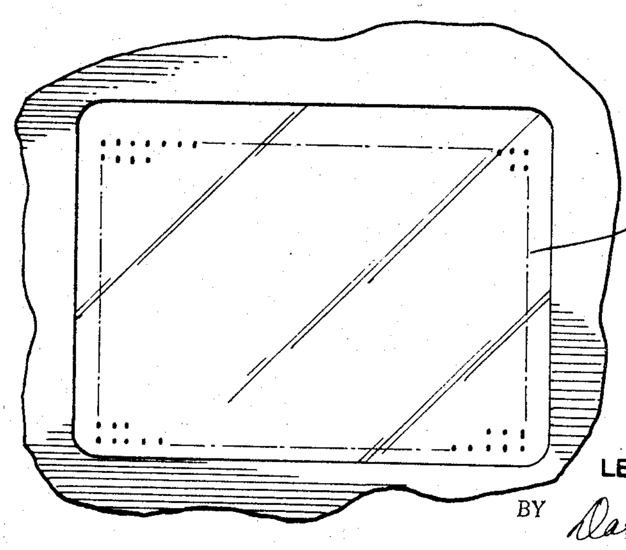
FIG. 5 is a top view of the film matrix looking along the line 5—5 of FIG. 2 showing the position of the individual microimages.

Referring now to FIG. 1, the original record to be reproduced is shown generally at 10. For purposes of explanation, the record is shown as consisting of the letter F. Further by way of example, it may be assumed that the record 10 is a normal 8 by 11 inch piece of paper and that the final chip will comprise a matrix of 9,801 (99×99) records each of which is to occupy a square area on the chip having dimensions of .026 inch per side. Under these circumstances it is necessary that the image 10 be reduced with great accuracy to a considerable extent but, of even greater importance, the image must be reproduced on the chip with extreme precision so that its location may be accurately addressed for read-out purposes. As an element in reducing the cost of the original chip, it is desirable to reduce by as much as possible the manual steps required so that the cost required to reproduce almost 10,000 records on a single chip will not be prohibitively high.

In accordance with the invention, the image 10, and the others like it are first photographed to form a continuous negative 12 having a plurality of serial frames, the frame corresponding to the particular image 10 being indicated at 12′. The negative 12 may be conventional 35 mm. film and each of the required images 10 may be photographed in accordance with well-known techniques to form the continuous negative 12.

A positive transparency 14 is formed from the negative 12 with the frame corresponding to image 10 shown at 14′. This 35 mm. film positive is also conventional and may include standard sprocket holes for advancing the transparency in either direction. To this point unusual precision is not a requisite so that each of the 10,000 images may be manually photographed, although of course any technique for automatically reducing the images to the continuous transparency would also be within the scope of the invention.

The photosensitive material corresponding to the film chip is shown at 16 with the record corresponding to the image 10 being illustrated at 16'. At this point it should be noted that no effort has been made to draw the images 10, 12', 14' and 16' to actual scale, it being recalled that the record 16' will occupy a square area having dimensions of .026 inch per side. Photosensitive material 16 rests on a table schematically illustrated at 18 which is continuously moved in the direction of arrow 20 by a motor 22. A conventional sprocket means 24 engages the sprocket holes of the 35 mm. transparency 14 and is driven by a motor 26 to step transparency 14 in the direction of arrow 28, i.e, transverse the direction of arrow 20.

A flash lamp 30 supplies the light for exposing negative 16 through a lens structure shown schematically at 32 which provides the required image reduction. A control unit 34 energizes the flash lamp 30 over line 38 when one of the frames 14 is suitably positioned with respect to the moving material 16. After the picture is taken, motor 26 drives the sprocket means 24 so that the next frame, i.e. frame 14'', is in position to be photographed. Because of the continuous movement of table 18, the next time lamp 30 is energized will be when the area shown at 16'' is beneath the lens 32 so that the pictures on the transverse moving strip 14 will be consecutively laid down on the photosensitive material 16.

When the edge of the material 16 has been reached, the table 18 may then be stepped in the direction of arrow 40 a sufficient distance to enable the next row in the matrix to be photographed immediately adjacent the row in which the images 16', 16'', etc. are illustrated. There are obviously numerous ways in which this function may be accomplished. In the simplest form the table may be manually stepped in the direction of arrow 40, returned opposite the direction of arrow 20, and the identical operation as described above repeated. If desired, it would be a simple expedient to perform these operations automatically in response to the actuation of limit switches or the like. As a further refinement, the direction of rotation of motor 22 may be reversed when the edge of the material 16 is reached so that the images are laid down in the opposite direction. This type of operation, however, might be less desirable in some cases because the addressing of the consecutive records might not run in a desired sequence, although if desired, the individual records could contain a notation advising the user which of the stored records is to be read next.

The final step is to develop a negative 42 of the film 16 after each position on the film has been exposed. This may be done in accordance with conventional practices, and, thereafter, as many positive transparencies as desired inexpensively reproduced.

FIGURES 2 through 5 illustrate a preferred embodiment of the apparatus for moving the films 14 and 16 transversely of each other. The device may include a photographic apparatus known as a Mann type 1080 photo-repeater and manufactured by the David W. Mann Company. Since this photorepeater is a commercially available item, it is not described herein in detail but rather in general terms. The photorepeater includes a table 50 which is movable along X and Y orthogonal axes by control means (not shown) to expose the film 16 on table 50 with a great accuracy. Film 16 is held on the table 50 beneath a glass plateholder 51.

At the top of the photorepeater a socket 52 contains a xenon flash tube (not shown) within a turret 54. Turret 54 also contains a narrow band and wide band, thin film monochromatic filter, and a clear glass bank which are used in a known fashion. A microscope 56 provides the required reduction to place the image on the film 16 located on table 50.

Above the top of the microscope 56 a base plate 60 for the 35 mm. film transport is located. A pair of supports 62 and 64 extend vertically from plate 60 for rotatably mounting supply and take-up reels 66 and 68, respectively. A motor 70 is suitably mounted on plate 60 and, through a drive cable 72, rotates a first spiral gear 74 which cooperates with a second spiral gear 76 to move the film 14 by means of a conventional sprocket wheel 78 and rollers 80 and 82. A spring pulley 85 is coupled around a wheel 84 (FIG. 3) and a second reel (not shown) immediately below wheel 84 and attached to the shaft 86 on which the sprocket wheel 78 and spiral gear 76 are positioned. The pulley provides a drive for reel 68 to take up the film as it is fed from the supply reel 66.

The mechanism for moving the film in a stepwise motion comprises a pair of claws 88 (FIG. 4) extending upwardly and secured to a yoke 90. Yoke 90 is moved back and forth in the direction shown by arrow 92 by a cam 94 eccentrically mounted on a shaft 96 secured to the spiral gear 74 and driven through cable 72 by motor 70. The cam 94 cooperates with a pair of horizontal arms 98 and 99 connected to yoke 90 to convert the rotary motion of the shaft 96 to reciprocating motion in an obvious fashion.

The film 14 includes sprocket holes 102 on each side thereof, and the claws 88 move up into the sprocket holes, advance the film 14 a distance equal to one frame, retract from the sprocket holes 102, and return to their initial position.

The vertical motion for the reciprocating claws 88 is provided by a rotatable disc 104 (FIG. 2) which includes a cam surface 106 adapted to cooperate with a cam follower 108. Follower 108 includes two spaced projections (not shown) which straddle the edge of the disc 104 so that when the cam surface 106 is moved into contact with one of the two projections, follower 108 is moved vertically thus urging the yoke 90 and the claws 88 into or out of engagement with the sprocket holes 102.

A plate 110 rests on top of the film 14 immediately above the claws 88, and includes two trackways 112 and 114 which receive respective claws 88 during the reciprocating motion thereof. The plate 110 may be pivotally supported by hinges 116 and 118 secured to plate 60 to permit access to the claws and film beneath the plate.

An adapter ring 120 rests on top of the plate 110 so as to envelop the frame which is to be reproduced on the film 16 resting on table 50. Ring 120 is shaped to suitably receive the turret assembly 54 of the photorepeater. A plate 122 rests in a similarly shaped opening in the plate 110, and includes a circular opening 124 enveloping only the image to be reproduced. The assembly so far described is secured to the photorepeater section 56 by three L-shaped brackets 126 welded or otherwise secured to base plate 60 and respective screws 128 and 130.

Referring again to FIG. 1, the continuous movement of the table 18 in the direction of arrow 20 will cause control unit 34 to generate signals which ignite the lamp 30 at suitable intervals to project the image framed in the opening 124 onto the photosensitive film 16. In this fashion the successive individual microimages are placed in a desired relationship on the material 16. With the apparatus as described, it is a simple manner to suitably control the speed of motor 70 so that the successive frames of film 14 are suitably positioned in the photorepeater when the control unit 34 energizes the lamp 30. Hence the images successively placed on the photosensitive film 16 will comprise consecutive images on the transparency 14 so that the entire microimage chip can be developed from the film 16.

Although a preferred embodiment of the invention has been illustrated and described the invention is not necessarily so limited and should be defined by the following claims.

What is claimed is:

1. method of producing a matrix of microimages of records, comprising the steps of storing a first reduced image of each of said records in consecutive fashion on a continuous strip of film, thereafter incrementally moving said film between a normally de-energized lamp and an image reducing lens which focusses one of the images of said film onto a flat photosensitive material secured on a supporting surface in a plane defined by X and Y axes, continually moving said supporting surface with respect to only one of said X and Y axes, energizing said lamp when an image on said film appears between said lamp and said lens to expose successive portions of said photosensitive material in a first row along said one axis, the rates of movement of said supporting surface and film being mutually dependent to control the positioning of said exposed portions, moving said supporting surface a predetermined distance along the other of said axes after a preselected number of images have been exposed on said photosensitive material, reversing the direction of movement of said supporting surface, and exposing successive portions of said photosensitive material in a second row along said one axis.

2. A process according to claim 1, wherein said supporting surface is returned to an initial position with respect to said one axis prior to forming each successive row of microimages on said photosensitive material.

References Cited

UNITED STATES PATENTS

| | | | |
|---|---|---|---|
| 2,585,927 | 2/1952 | Gelb | 88—24 |
| 2,690,696 | 10/1954 | Ashton | 88—24 |
| 3,261,259 | 7/1966 | Baptie et al. | 88—24 |
| 3,299,776 | 1/1967 | Baptie et al. | 88—24 |

OTHER REFERENCES

Chand: IBM technical disclosure bulletin, "Step and Repeat Camera," vol. 7, No. 4, September 1964, pp. 329–30.

NORTON ANSHER, *Primary Examiner.*

RICHARD A. WINTERCORN, *Assistant Examiner.*

U.S. Cl. X.R.

95—36; 355—54